(12) United States Patent
Anand

(10) Patent No.: US 11,256,594 B1
(45) Date of Patent: Feb. 22, 2022

(54) METHOD AND APPARATUS FOR ESTIMATING A TIME TO PERFORM AN OPERATION ON A PROSPECTIVE DATA SET IN A CLOUD BASED COMPUTING ENVIRONMENT

(71) Applicant: salesforce.com, inc., San Francisco, CA (US)

(72) Inventor: Manish Kumar Anand, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 9 days.

(21) Appl. No.: 16/984,985

(22) Filed: Aug. 4, 2020

(51) Int. Cl.
*G06F 7/00* (2006.01)
*G06F 11/34* (2006.01)
*G06F 16/23* (2019.01)
*G06F 16/25* (2019.01)
*G06F 16/2458* (2019.01)

(52) U.S. Cl.
CPC ...... *G06F 11/3419* (2013.01); *G06F 11/3428* (2013.01); *G06F 16/2386* (2019.01); *G06F 16/2462* (2019.01); *G06F 16/256* (2019.01)

(58) Field of Classification Search
CPC .............. G06F 16/2386; G06F 16/256; G06F 16/2462; G06F 11/3428
USPC ..................................... 707/687, 688, 999.1
See application file for complete search history.

(56) References Cited

U.S. PATENT DOCUMENTS

| | | | |
|---|---|---|---|
| 11,003,429 B1* | 5/2021 | Zejda | G06F 8/445 |
| 2004/0243380 A1* | 12/2004 | Blevins | G05B 17/02 |
| | | | 703/22 |
| 2020/0125400 A1* | 4/2020 | Venkataraman | G06N 20/00 |

* cited by examiner

*Primary Examiner* — Md I Uddin
(74) *Attorney, Agent, or Firm* — Elliott, Ostrander & Preston, P.C.

(57) ABSTRACT

Estimating a time to perform an operation on a prospective data set of a selected size that includes a plurality of data entities and relationships between the data entities. A number of data sets of different size each comprising a number of like data entities and like relationships between the like data entities are received as input. A number of actions performed on a subset of the number of like data entities and like relationships between the like data entities that substantially comprise the operation are provided as output. For each of the number of data sets of different size, an elapsed time to perform a batch process for each of the number of actions on the subset of the number of like data entities and like relationships between the like data entities that comprise the operation is calculated. Finally, an elapsed time to perform the operation on the prospective data set based on its selected size and the elapsed times to perform, for each of the number of data sets of different size, the batch process for each of the number of actions on the subset of the number of like data entities and like relationships between the like data entities that comprise the operation is estimated, and provided as output.

17 Claims, 13 Drawing Sheets

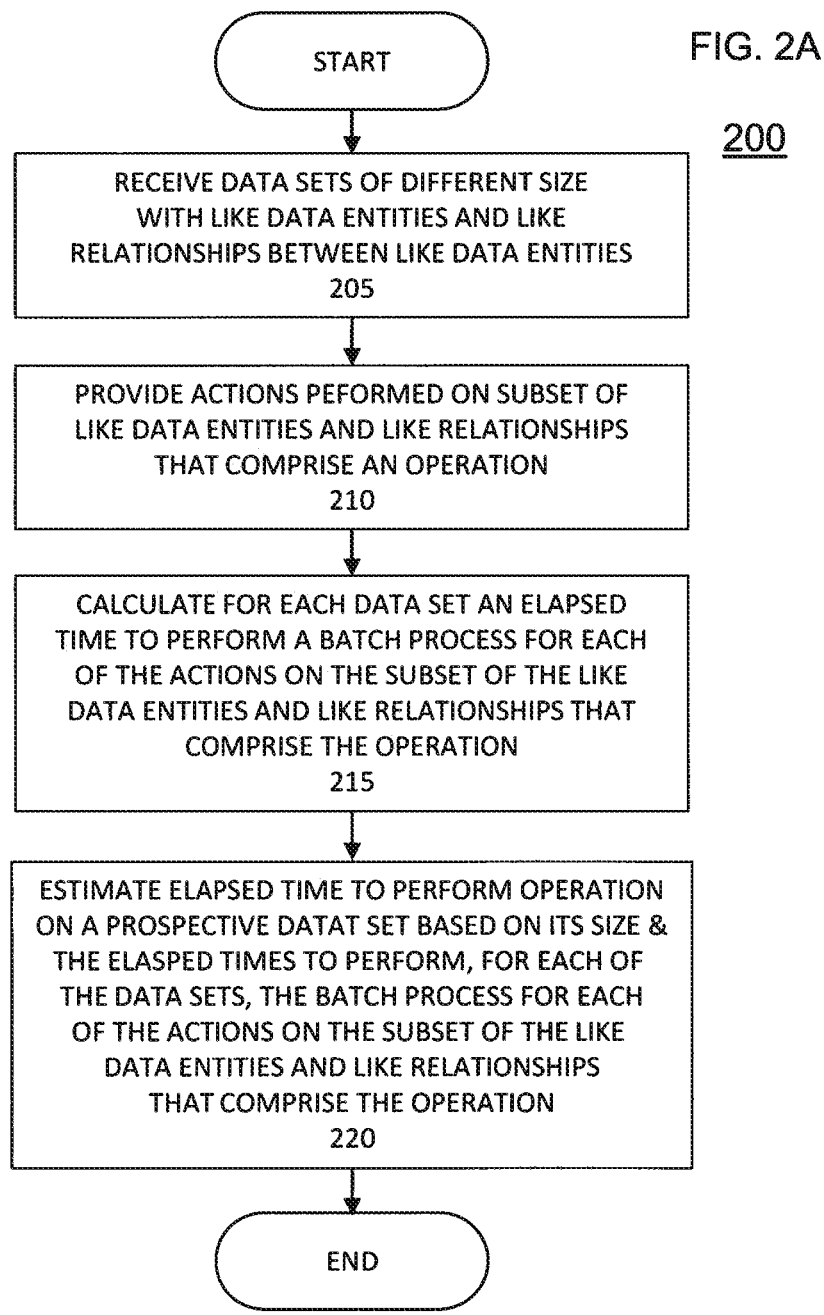

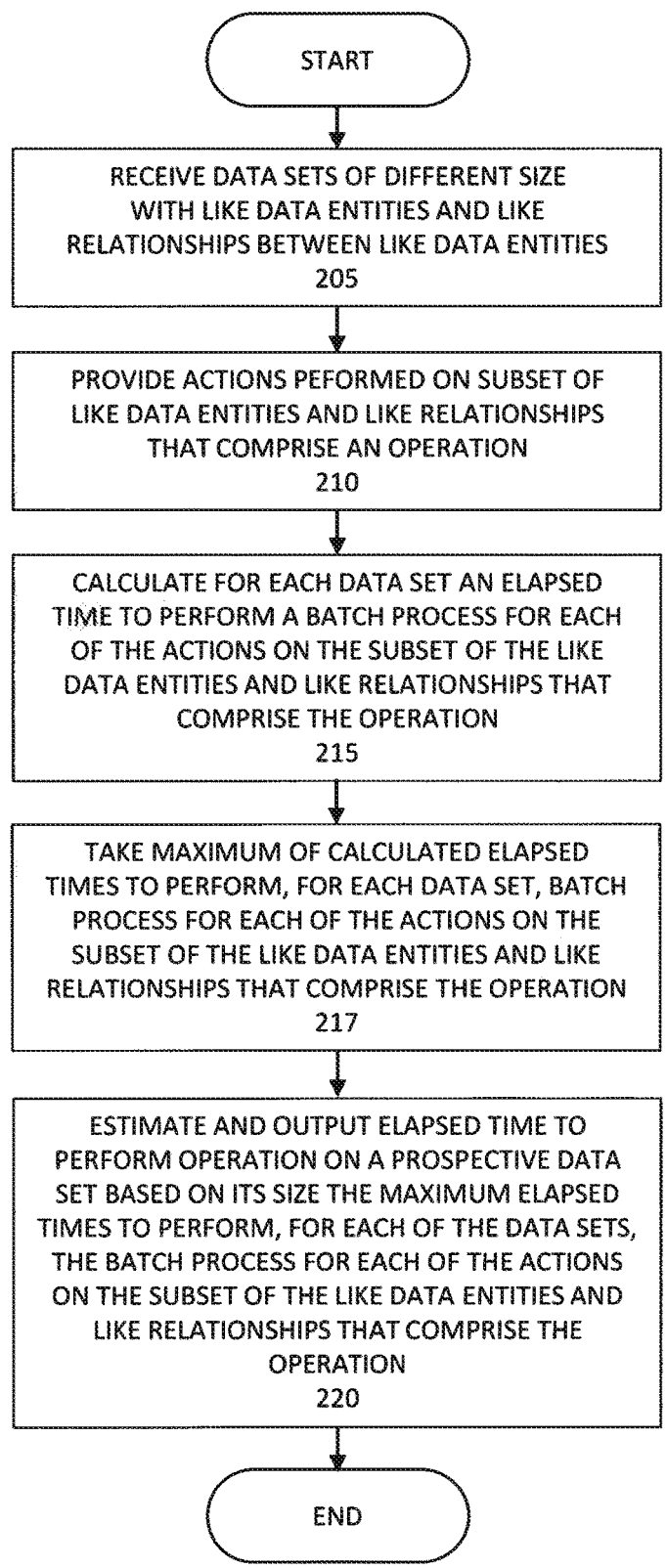

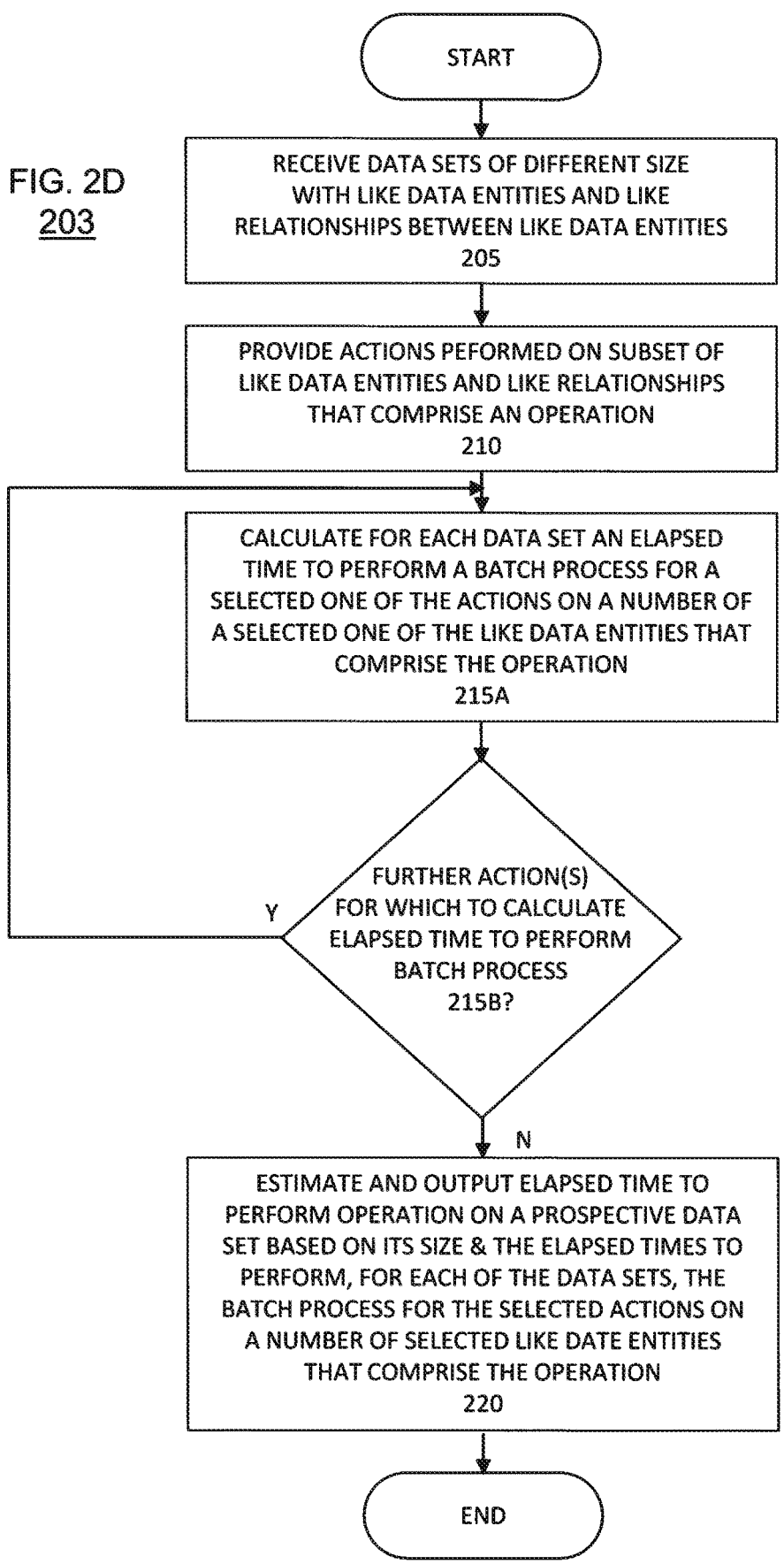

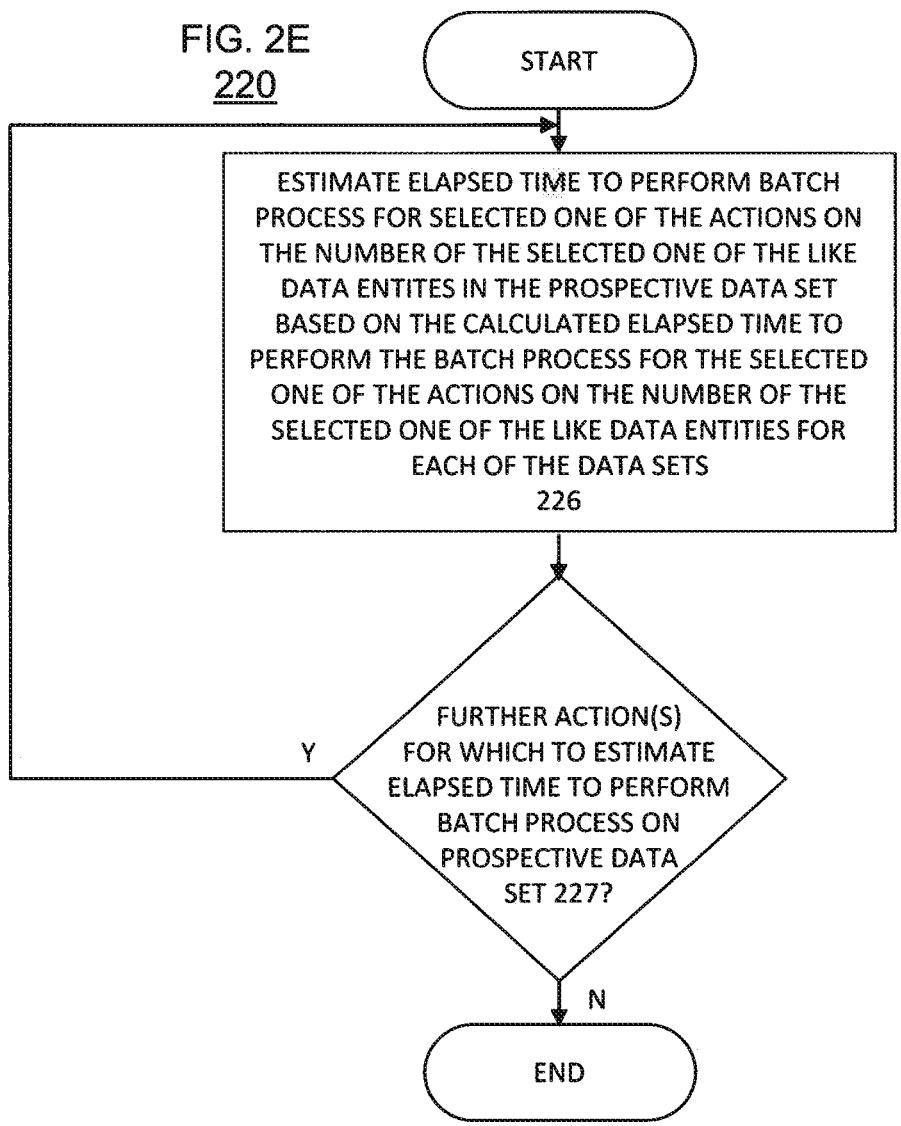

|                      | Existing data sets 310 | | | Prospective |
| Entity/Relation 315  | Small 320 | Medium 325 | Large 330 | data set 335 |
|---|---|---|---|---|
| Territory 301  | 2,036    | 25,566    | 96,110     | 200,000    |
| Users 302      | 10,919   | 180,853   | 512,205    | 600,000    |
| Account 303    | 206,266  | 2,614,902 | 9,737,804  | 20,000,000 |
| OTA 304        | 206,266  | 2,614,902 | 9,737,804  | 20,000,000 |
| Opportunity 305| 412,524  | 5,325,003 | 19,475,614 | 40,000,000 |
| Contact 306    | 412,538  | 5,229,810 | 13,347,128 | 40,000,000 |
| Cases 307      | 412,534  | 5,228,806 | 13,347,124 | 40,000,000 |

FIG. 3
300

| Operation/Action 405 | Existing data sets 310 | | |
| --- | --- | --- | --- |
| | Small 320 | Medium 325 | Large 330 |
| Archive Op 410 | 6.53 | 71.9 | 256.35 |
| Opportunity (305) = NULL 415 | 4.97 | 59.92 | 205.77 |
| Delete data entities related to territory data entities (301) 420 | 1.18 | 11.43 | 48.4 |

Updating 10,000 opportunity data entities 305 per batch:

| Existing data sets 310 | # Opportunities 305 | Total time (min) 510 | Time (sec) per batch 515 |
|---|---|---|---|
| Small 320 | 412,524 | 4.97 | 7.23 |
| Medium 325 | 5,325,003 | 59.92 | 6.75 |
| Large 330 | 19,475,614 | 205.77 | 6.34 |

FIG. 5B 525

Deleting data entities related to territory data entities 301 per 1000 territories each batch:

| Existing data sets 310 | # Territories 301 | Total time (min) 530 | Time (sec) per batch 535 |
|---|---|---|---|
| Small 320 | 2,036 | 1.18 | 25.5 |
| Medium 325 | 25,556 | 11.43 | 26.84 |
| Large 330 | 96,110 | 48.4 | 30.22 |

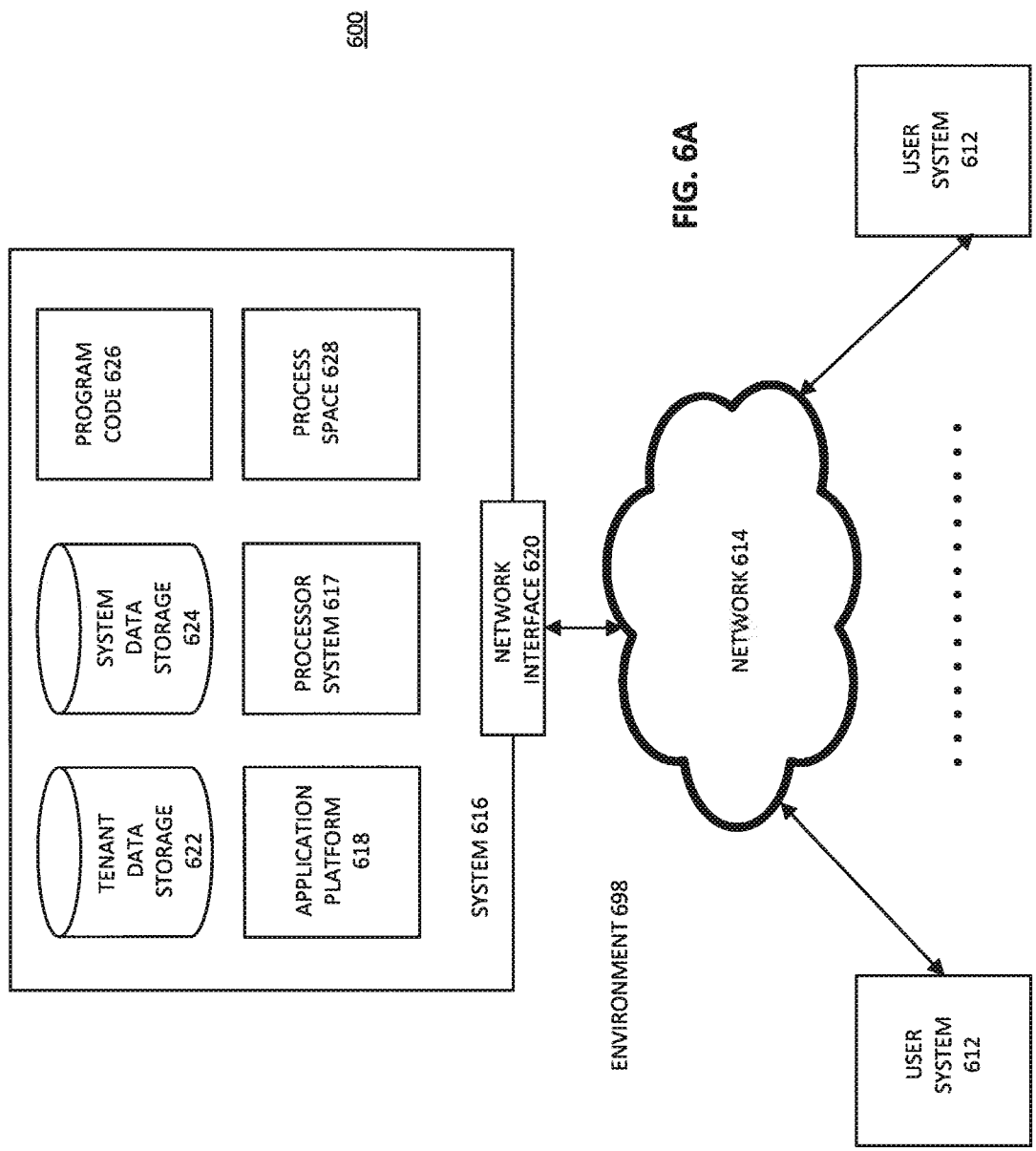

METHOD AND APPARATUS FOR ESTIMATING A TIME TO PERFORM AN OPERATION ON A PROSPECTIVE DATA SET IN A CLOUD BASED COMPUTING ENVIRONMENT

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

Embodiments disclosed herein relate generally to the field of computing, and more particularly, to systems, methods, and apparatuses for estimating a time to perform an operation on a prospective, or proposed, dataset in a cloud based computing environment. Such embodiments may be implemented within the computing architecture of a hosted computing environment, such as an on-demand or cloud-computing environment that utilizes multi-tenant database technologies, client-server technologies, traditional database technologies, or other computing architecture in support of the hosted computing environment.

BACKGROUND

The subject matter discussed in this background section should not necessarily be construed as prior art merely because of its mention in this section. Similarly, a problem mentioned in this section or associated with the subject matter of this section should not be construed as being previously recognized in the prior art. The subject matter in this section merely represents different approaches, which in and of themselves may also correspond to claimed embodiments.

Benchmarking operational performance of a data set in a sandbox organization, i.e., a performance organization, in a cloud computing environment can be very time consuming, as the performance of selected operations on ever larger data sets is tested. In particular, it takes time to build and populate very large data sets so that performance tests can be run on the data sets to see what performance results in the sandbox or performance organization and draw from such tests performance results for comparably configured data sets in a production organization, or a "live" customer organization. What is needed is a way to estimate the performance of selected operations on data sets of any size, and in particular on very large data sets, without the need to take the significant amount of time (weeks in some cases) required for a performance team to actually build and populate the data sets, and without the need to take the time to actually execute the CPU cycles (tens of hours in some cases) required to conduct the performance tests on the very large data sets, with sufficient accuracy so that performance estimates on very large data sets for the sandbox or performance organization can accurately inform performance estimates for a comparable performance on very large data sets in a similarly configured production customer organization.

Systems, methods, and apparatuses for estimating a time to perform an operation on a prospective dataset in a performance organization within a cloud based computing environment will solve these problems.

BRIEF DESCRIPTION OF THE DRAWINGS

Embodiments are illustrated by way of example, and not by way of limitation, and will be more fully understood with reference to the following detailed description when considered in connection with the figures in which:

FIG. 2A depicts a functional block diagram for estimating the elapsed time to perform an operation on a prospective data set in a cloud based computing environment in accordance with disclosed embodiments;

FIG. 2C depicts a functional block diagram for estimating the elapsed time to perform an operation on a prospective data set in a cloud based computing environment in accordance with disclosed embodiments;

FIG. 2D depicts a functional block diagram for estimating the elapsed time to perform an operation on a prospective data set in a cloud based computing environment in accordance with disclosed embodiments;

FIG. 2E depicts a functional block diagram for aspects of estimating the elapsed time to perform an operation on a prospective data set in a cloud based computing environment in accordance with disclosed embodiments;

FIG. 3 is a table expressing the amount of time it takes to perform a batch process for each of a plurality of actions on a subset of the data entities and relationships between the data entities that comprise an operation in accordance with disclosed embodiments;

FIG. 4 is a table that depicts a number of actions to be performed on a subset of data entities that substantially comprise an operation to be performed on a prospective data set in accordance with disclosed embodiments;

FIGS. 5A and 5B are tables that depict the action of updating and deleting data entities in data sets, executed as batch processes, in accordance with disclosed embodiment;

FIGS. 6A and 6B illustrate block diagrams of a computing environment within which the described methodologies may operate in accordance with the described embodiments;

DETAILED DESCRIPTION

Figure 1:
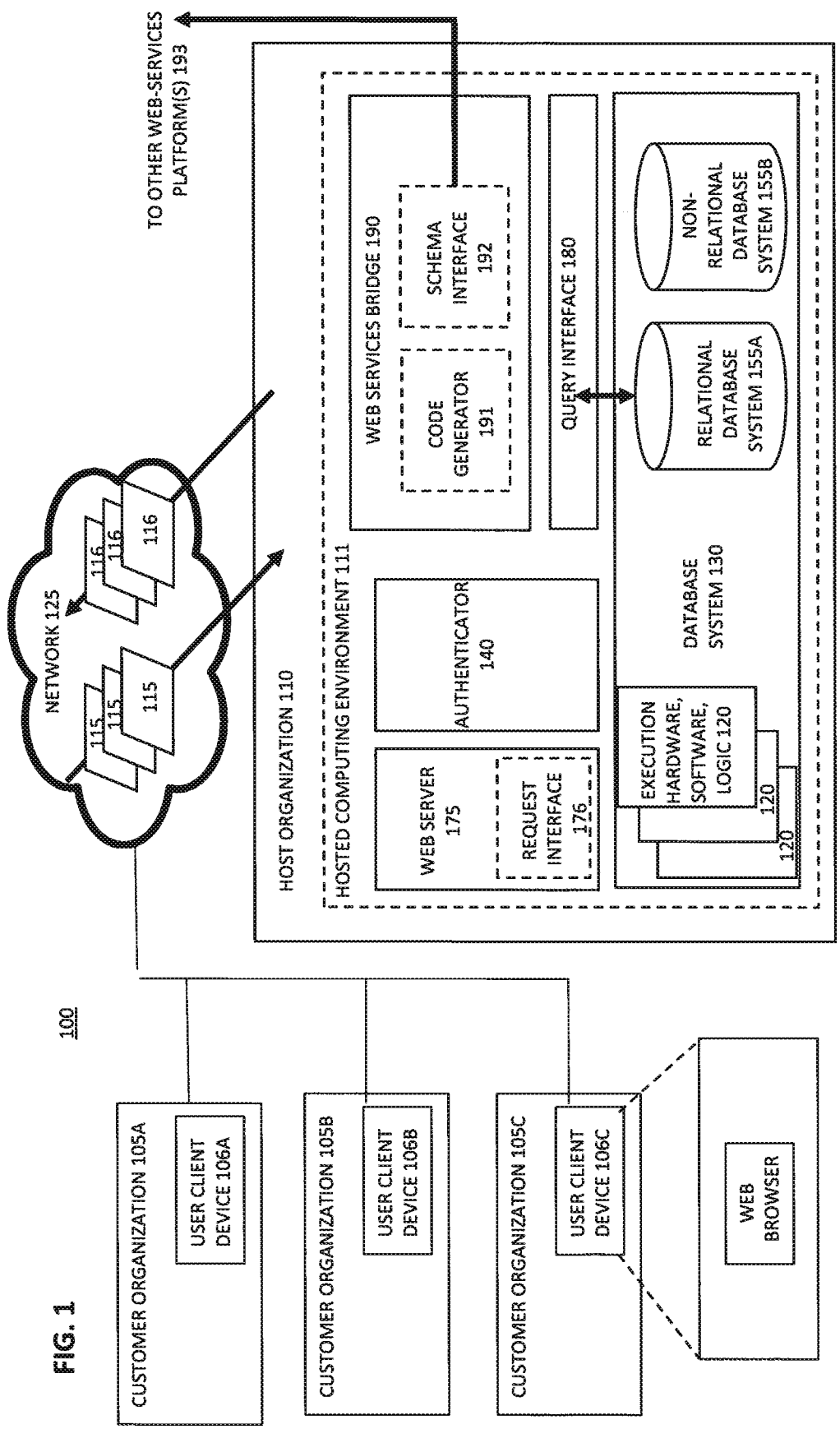
FIG. 1 depicts an exemplary architecture in accordance with described embodiments.

Described herein are systems, methods, and apparatuses for estimating a time to perform an operation on a prospective dataset in a performance organization within a cloud based computing environment. For instance, such an exemplary system, having a processor and a memory therein, estimates a time to perform an operation on a prospective dataset in a performance organization by examining the times for executing batch processes on actual, similar data sets of varying size, and extrapolating therefrom an estimate for the time to perform the operation on the prospective data set.

In the following description, numerous specific details are set forth such as examples of specific systems, languages, components, etc., in order to provide a thorough understanding of the various embodiments. It will be apparent, however, to one skilled in the art that these specific details need not be employed to practice the embodiments disclosed herein. In other instances, well-known materials or methods are described in detail in order to avoid unnecessarily obscuring the disclosed embodiments.

In addition to various hardware components depicted in the figures and described herein, embodiments further include various operations that are described below. The operations described in accordance with such embodiments may be performed by hardware components or may be embodied in machine-executable instructions, which may be used to cause a general-purpose or special-purpose processor programmed with the instructions to perform the operations. Alternatively, the operations may be performed by a combination of hardware and software.

Embodiments also relate to an apparatus for performing the operations disclosed herein. This apparatus may be specially constructed for the required purposes, or it may be a general purpose computer selectively activated, configured, or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems appears as set forth in the description below. In addition, embodiments are not described with reference to any particular programming language. It will be appreciated that a variety of programming languages may be used to implement the teachings of the embodiments as described herein.

Embodiments may be provided as a computer program product, or software, that may include a machine-readable medium having stored thereon instructions, which may be used to program a computer system (or other programmable electronic devices) to perform a process according to the disclosed embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical), etc.

Any of the disclosed embodiments may be used alone or together with one another in any combination. Although various embodiments may have been partially motivated by deficiencies with conventional techniques and approaches, some of which are described or alluded to within the specification, the embodiments need not necessarily address or solve any of these deficiencies, but rather, may address only some of the deficiencies, address none of the deficiencies, or be directed toward different deficiencies and problems which are not directly discussed.

FIG. 1 depicts an exemplary architecture 100 of a cloud computing environment in accordance with described embodiments. In one embodiment, a hosted computing environment 111 is communicably interfaced with a plurality of user client devices 106A-C (e.g., such as mobile devices, smart phones, tablets, PCs, etc.) through host organization 110. In one embodiment, a database system 130 includes databases 155A and 155B, for example, to store application code, object data, tables, datasets, and underlying database records with user data on behalf of client, or customer, organizations 105A-C, and communities 106A-C (e.g., users of such a database system 130 or tenants of a multi-tenant database type database system or the affiliated users of such a database system). Such databases include various database system types including, for example, a relational database system 155A and a non-relational database system 155B according to certain embodiments.

Certain embodiments may utilize a client-server computing architecture to supplement features, functionality, or computing resources for the database system 130 or alternatively, a computing grid, or a pool of work servers, or some combination of hosted computing architectures may be utilized to carry out the computational workload and processing demanded of the host organization 110 in conjunction with the database system 130.

The database system 130 depicted in the embodiment shown includes a plurality of underlying hardware, software, and logic elements 120 that implement database functionality and a code execution environment within the host organization 110.

In accordance with one embodiment, database system 130 utilizes the underlying database systems 155A and 155B to service database queries and other data interactions with the database system 130 that communicate with the database system 130 via the query interface. The hardware, software, and logic elements 120 of the database system 130 are separate and distinct from a number of customer organizations (105A, 105B, and 105C) which utilize web services and other service offerings as provided by the host organization 110 by communicably interfacing to the host organization 110 via network 125. In such a way, host organization 110 may implement on-demand services, on-demand database services or cloud computing services to subscribing customer organizations 105A-C.

Further depicted is the host organization 110 receiving input and other requests 115 from a number of customer organizations 105A-C via network 125 (such as a public Internet). For example, incoming search queries, database queries, API requests, interactions with displayed graphical user interfaces and displays at the user client devices 106A-C, or other inputs may be received from the customer organizations 105A-C to be processed against the database system 130, or such queries may be constructed from the inputs and other requests 115 for execution against the databases 155A and 155B or the query interface 180, pursuant to which results 116 are then returned to an originator or requestor, such as a user of one of a user client devices 106A-C at a respective customer organization 105A-C.

In one embodiment, a customer organization 105A-C is a separate and distinct remote organization, an organizational group within the host organization 110, a business partner of the host organization 110, or a customer organization 105A-C that subscribes to cloud computing services provided by the host organization 110.

In one embodiment, requests 115 are received at, or submitted to, a web-server 175 within host organization 110. Host organization 110 may receive a variety of requests for processing by the host organization 110 and its database system 130. Incoming requests 115 received at web-server 175 may specify which services from the host organization 110 are to be provided, such as query requests, search request, status requests, database transactions, graphical user interface requests and interactions, processing requests to retrieve, update, or store data on behalf of one of the customer organizations 105A-C, code execution requests, and so forth. Web-server 175 may be responsible for receiving requests 115 from various customer organizations 105A-C via network 125 on behalf of the query interface 180 and for providing a web-based interface or other graphical displays to an end-user user client device 106A-C or machine originating such data requests 115.

The query interface 180 is capable of receiving and executing requested queries against the databases and storage components of the database system 130 so as to return a result set, response, or other requested data in furtherance of the methodologies described. The query interface 180 additionally provides functionality to pass queries from web-server 175 into the database system 130 for execution against the databases 155A and 155B for processing search queries, or into the other available data stores of the host organization's computing environment 111. In one embodiment, the query interface 180 implements an Application Programming Interface (API) through which queries may be executed against the databases 155A and 155B or the other data stores.

Host organization 110 may implement a request interface 176 via web-server 175 or as a stand-alone interface to receive requests packets or other requests 115 from the user client devices 106A-C. Request interface 176 further supports the return of response packets or other replies and responses 116 in an outgoing direction from host organization 110 to the user client devices 106A-C. Authenticator 140 operates on behalf of the host organization to verify, authenticate, and otherwise credential users attempting to gain access to the host organization.

Still further depicted within the hosted computing environment 111 is the web-services bridge 190 having therein both a code generator 191 and also a schema interface 192 (also referred to as an inter-agent schema interface) capable of communicating with other web-services platform(s) 193 which regardless of whether such web-services environments are hosted by the same host organizations 110 or hosted by different host organizations.

With reference to FIG. 2A, embodiments of the invention 200 estimate a time for a computing system, such as a cloud based computing environment hosted by a cloud computing services provider, to perform an operation on a prospective data set of a selected size, for example, an operation on a customer performance organization's prospective data set of a selected size, that includes a number data entities (i.e., data records) and relationships between the data entities. For example, with reference to FIG. 3 for purposes of explanation only, and not limiting embodiments of the invention to this example, a prospective data set 335 is a sales territory management data set.

The prospective data set 335 includes data entities 315 such as a sales territory, or simply, territory, 301, users 302, account 303, Object Territory Association (OTA—a relationship between a territory and an account) 304, opportunity 305, contact 306, and cases 307. There are relationships between at least some of the data entities 315, such as, for example, each territory 301 has approximately 100 accounts 303, each account 303 has approximately two opportunities 305, contacts 306, and cases 307, associated with it, and each account 303 is associated with only one territory 301. These relationships between data entities are evidenced with reference to the example data sets depicted in FIG. 3 wherein the number of accounts 303 for prospective data set 335 is 20,000,000, and the number of territories 301 for the prospective data set 335 is 200,000, while the number of opportunities 305, contacts 306, and cases 307, number 40,000,000 each. The size of the prospective sales territory management data set 335, which may be selected by user or automated input, is defined by the numbers of the data entities 315 that comprise the data set, and the relationships between the data entities 315. In the example prospective data set 335 depicted in FIG. 3 there are, for instance, 200,000 territory data entities 301 (or simply territories 301) and 40,000,000 opportunity data entities 305 (or simply opportunities 305). An operation that may be executed on the prospective data set 335 of a selected size may be, as examples, an archive operation, a cloning operation, or an activation operation on a clone of the prospective data set 335. Of course, embodiments of the invention may be practiced with any operations to be executed on the prospective data set 335. In the example that follows, embodiments of the invention are practiced on an archival, or archive, operation to be performed on the prospective data set 335.

Again with reference to FIG. 2A, embodiments of the invention receive as input at block 205 a number of existing data sets of different size each comprising a number of the same, or like, or similar, data entities, and the same, or like, or similar, relationships between the same, like, or similar, data entities as those found in the prospective data set 335. For example, with reference again to FIG. 3, three existing data sets 310 of different sizes, e.g., small sized data set 320, medium sized data set 325, and large sized data set 330 share the same data entities 315, namely, territory 301, users 302, account 303, Object Territory Association (OTA) 304, opportunity 305, contact 306, and cases 307, as prospective data set 335. In other embodiments, the existing data sets may only share some of the same, or similar, data entities as the prospective data set. Further, while FIG. 3 depicts three existing data sets, embodiments of the invention may be practiced with a fewer or greater number existing data sets.

Just as the existing data sets of different sizes (320, 325 and 330) share at least some of the same, like, or similar data entities 315 as the prospective data set 335, these existing data sets further share at least some of the same, like, or similar relationships between data entities. For example, with respect to the existing data sets 320, 325 and 330 depicted in FIG. 3 there are relationships between at least some of the data entities 315, such as, for example, each territory 301 has approximately 100 accounts 303, each account 303 has approximately two opportunities 305, contacts 306, and cases 307, associated with it, and each account 303 is associated with only one territory 301. These relationships between data entities are evidenced with reference to FIG. 3 wherein the number of accounts 303 for small sized data set 320 is 206,266 and the number of territories 301 is 2,036, while the number of opportunities 305, contacts 306, and cases 307, number 412,524, 412,538 and 412,534, respectively. Similarly, medium sized data set 325 and large sized data set 330 have similar relationships between accounts 303, territories 301, opportunities 305, contacts 306, and cases 307, but differ from small sized data set 320, and each other, in terms of orders of magnitude (e.g., logarithmically). It is appreciated that while the size of the small, medium and large data sets 320, 325 and 330 differ in terms of orders of magnitude, the size of the data sets may differ in linear or exponential terms, the point being that with two or more data sets of different size, embodiments of the invention can calculate an elapsed time to perform a batch process for each of a number of actions on a subset of data entities and corresponding relationships between the data entities that comprise an operation on each of the two or more data sets and use those calculations to estimate an elapsed time to perform the batch process for each of the number of same or similar actions on the same or similar subset of data entities and corresponding relationships between the data entities that comprise the operation on the prospective data set, as described herein.

According to one embodiment, the actions performed on the subset of the like data entities and like relationships between the like data entities that substantially comprise the operation are independent, asynchronous, actions with respect to each other and insofar as system resources to perform the actions are concerned. These independent, asynchronous actions are performed on the subset of the like data entities and like relationships between the like data entities that substantially comprise the operation, according to the embodiment.

Embodiments of the invention provide as output at block 210 a number of actions to be performed on a subset of the data entities 315 and relationships between the subset of data entities that substantially comprise the operation to be performed on the prospective data set 335. For example, an operation such as the archive operation referred to above involves two main actions: an action of updating the opportunity data entities 305 in a data set to a value of NULL (to break a relationship between the opportunity data entities 305 and the territory data entities 301), and an action of deleting data entities related to (i.e., data entities that have a relationship with) each territory data entity in a data set. No other data entities in the data sets are relevant, or matter, i.e., they are not involved or acted upon, insofar as the archive operation is concerned. Thus, only a subset of the data entities and relationships between or related to the subset of data entities are acted upon by the actions that are performed in the context of executing the archive operation. It is appreciated that an operation such as the archive operation may involve additional actions beyond the two main actions identified above, but as such actions do not take significant time relative to the main actions, they can be treated as minor actions and ignored according to embodiments of the invention so long as the output at block 210 provides the actions to be performed on a subset of the data entities 315 and relationships between the data entities that substantially comprise the operation to be performed on the prospective data set 335.

For example, with reference to the example archive operation depicted in FIG. 4, table 400 lists a number of actions to be performed on a subset of the data entities 315 and relationships between the data entities that substantially comprise the operation to be performed on the prospective data set 335. For example, column 405 in table 400 defines an operation, or an action in support of the operation, such as the archive operation listed at 410 in column 405 which comprises the actions of updating the opportunity data entities 305 in a data set to a value of NULL (listed at 415 in column 405), and deleting data entities related to each territory data entity 301 in a data set (listed at 420 in column 405). The time, in minutes, that the archive operation takes to complete for each data set 310 is listed at 6.53 minutes for small sized data set 320, 71.9 minutes for medium sized data set 325, and 256.35 minutes for large sized data set 330. The table 400 breaks down the elapsed time to perform the archive operation 410 into the elapsed time to perform each main action that comprises the archive operation. For example, the time, in minutes, that it takes to complete setting the opportunity data entities to NULL for each data set 310 is listed at 4.97 minutes for small sized data set 320, 59.92 minutes for medium sized data set 325, and 205.77 minutes for large sized data set 330. Likewise, the time, in minutes, that it takes to delete data entities related to the territory data entities for each data set 310 is listed at 1.18 minutes for small sized data set 320, 11.43 minutes for medium sized data set 325, and 48.4 minutes for large sized data set 330. It is noted that approximately 80 percent of the time it takes to perform the archive operation is spent on setting the opportunity data set to NULL for each data set 310, and approximately 18 percent of the time is spent on deleting the data entities that relate to the territory data entities 301 for each data set. Other actions performed in support of, or overhead associated with, the archive operation amount in total to approximately two percent of the total time to perform the archive operation and thus can be ignored according to embodiments since they do not take a significant amount of the overall time to complete the operation. In general, it is appreciated that an operation such as the archive operation referred to above may involve additional actions, but as such actions do not take significant time relative to the main actions, they can be ignored according to embodiments of the invention so long as the output at block 210 provides the actions to be performed on a subset of the data entities 315 and relationships between the data entities that substantially comprise the operation to be performed on the prospective data set 335.

Referring again to FIG. 2A, embodiments of the invention calculate at block 215 for each of the data sets of different size an elapsed time to perform a batch process for each of the actions on the subset of the data entities and relationships between the data entities that comprise the operation. For example, with reference to table 300 in FIG. 3, embodiments calculate for each of data sets 320, 325 and 330 the amount of time it takes to perform a batch process for each of the actions on the subset of the data entities and relationships between the data entities that comprise the operation, as identified in block 210. In this example, the two main actions that comprise the archive operation include the action of updating the opportunity data entities 305 to a value of NULL and the action of deleting data entities related to each territory data entity 301 in a data set. The subset of the data entities 315 on which an action is performed as part of the archive operation include the opportunity data entities 305 (which are set to a value of NULL), and the territory data entities 301 (in which records or data entities related to the territory data entities are deleted).

Stated another way, embodiments of the invention 203, with reference to FIG. 2D, calculate at block 215A for each of the data sets of different size an elapsed time to perform a batch process for a selected one of the actions on a number of a selected one of the like data entities that comprise the operation. The embodiment then checks at block 215B for further actions on or for which to calculate an elapsed time to perform a batch process for another selected one of the actions on a number of the selected one or the like data entities that comprise the operation, and if such further actions exist, processing returns to block 215A until the calculations have been performed for all such actions. For example, with reference to FIG. 3, embodiments first calculate for each of data sets 320, 325 and 330 the amount of time it takes to perform a batch process for the action of updating the opportunity data entities 305 to a value of NULL. Since, in this example, there are two main actions that comprise the archive operation including the action of updating the opportunity data entities 305 to a value of NULL and the action of deleting data entities related to each territory data entity 301 in a data set, logic at block 215B returns processing to block 215A, wherein the embodiments next calculate for each of data sets 320, 325 and 330 the amount of time it takes to perform a batch process for the action of deleting records or data entities related to the territory data entities 301.

For example, with reference to the example table 500 depicted in FIG. 5A, the action of updating opportunity data entities 305 to NULL in the data sets 320, 325 and 330, executed as batch processes in which 10,000 opportunity data entities are acted upon during each batch process, it is seen that the total time 510 to perform the update operation on the 412,524 opportunity entities 305 in the small sized data set 320 is 4.97 minutes, and the per batch time 515 is 7.23 seconds. Likewise, the total time 510 to perform the operation on the 5,325,003 opportunity entities 305 in the medium sized data set 325 is 59.92 minutes, at a per batch time 515 of 6.75 seconds. Similarly, the total time 510 to perform the update operation on the 19,475,614 opportunity entities 305 in the large sized data set 330 is 205.77 minutes, yielding a per batch time 515 of 6.34 seconds. Similarly, with reference to the example table depicted in FIG. 5B, the action of deleting data entities related to the territory data entities 301 in the data sets 320, 325 and 330, executed as batch processes in which 1000 territory data entities 301 are acted upon during each batch process, it is seen that the total time 530 to perform the delete operation related to the 2,036 territory entities 301 in the small sized data set 320 is 1.18 minutes, and the per batch time 535 is 25.5 seconds. Likewise, the total time 513 to perform the delete operation related to the 25,556 territory entities 301 in the medium sized data set 325 is 11.43 minutes, with a per batch time 535 of 26.84 seconds. Finally, the total time 530 to perform the delete operation related to the 96,110 territory data entities 301 in the large sized data set 330 is 48.4 minutes, which is a per batch time 515 of 30.22 seconds.

By providing the overall time it takes to perform an operation on each of the existing data sets (as depicted in the example in FIG. 4), the time it takes to perform each of the actions that comprise the operation on each of the existing data sets, and the number of data entities on which an action is taken per batch process (as depicted in the tables in FIGS. 5A, 5B) embodiments of the invention provide a detailed analysis of, and output for, how long it takes to perform an operation on the existing data sets, including at the batch processes level. That is, embodiments of the invention provide, for each existing data set, the elapsed time to perform a batch process on or for each action on the relevant subset of data entities and corresponding relationships between those data entities that comprise the operation. This is particularly helpful given that the number of data entities on which an action is taken can differ significantly between the existing data sets and the prospective data set (i.e., the difference need not, and in fact the difference may not, be proportional), and yet the embodiments, because they capture the elapsed time to perform a batch process on or for each action on the relevant subset of data entities and corresponding relationships between those data entities that comprise the operation in the existing data sets, can accurately estimate the overall elapsed time to perform the operation of the prospective data set.

With reference again to FIG. 2A, embodiments estimate at block 220 and provide as output an elapsed time to perform the operation on the prospective data set based on its selected size and the elapsed times to perform, for each of the plurality of data sets of different size, the batch process for each of the plurality of actions on the subset of the plurality of like data entities and like relationships between the like data entities that comprise the operation. For example, again with reference to FIGS. 5A and 5B, embodiments estimate at block 220 and provide as output an elapsed time to perform the archive operation on the prospective data set 335 based on its selected size and the elapsed times to perform, for each of the data sets of different size 320, 325, 330, the batch process for updating the opportunities data entities 305 and the batch process for deleting data entities related to territory data entities 301 that comprise the bulk of the archive operation.

Stated another way, embodiments of the invention 220, with reference to FIG. 2E, estimate at block 226 the elapsed time to perform a batch process for a selected one of the actions on a number of the selected one of the like data entities in the prospective data set based on the calculated elapsed time to perform the batch process for the selected one of the actions on the number of the selected one of the like data entities for each of the existing data sets. The embodiment then checks at block 227 for further actions for which to estimate the elapsed time to perform a batch process for or on the prospective data set, and if such further actions exist, processing returns to block 226 until the estimate has been performed for all such actions. For example, with reference to FIGS. 5A and 5B, embodiments estimate, for the prospective data set, and provide as output, at block 226, an elapsed time to perform the batch process for updating the opportunities data entities 305. Since, in this example, there are two main actions that comprise the archive operation, namely, updating the opportunities data entities and deleting data entities related to each territory data entity, logic block 227 returns processing to logic block 226, wherein embodiments next estimate for the prospective data set, and provide as output, an elapsed time to perform the batch process for deleting data entities related to territory data entities 301.

In particular, with reference to the example archive operation discussed herein, and with reference to the batch processing times depicted in the tables of FIGS. 5A and 5B, given a prospective data set 335 with a T_count=200,000 territory data entities 301 related to data entities to be deleted, and an #_Opp_Update=40,000,000 opportunity data entities 305 to be updated to a NULL value, the time to perform the archive operation can be estimated as:

$$\#\_Opp\_Update/10{,}000 * 6.77\ sec + T\_count/1{,}000 * 27.52\ sec$$

Thus, the estimated time to perform the archive operation for the prospective data set 335, given:
_Opp_Update for prospective data set 335=40,000,000
T_count for prospective data set 335=200,000 is:

$$40{,}000{,}000/10{,}000*6.77\ sec+200{,}000/1{,}000*27.52\ sec=451.33\ min+91.97\ min=543.06\ min=9.05\ hrs.$$

Figure 2B:
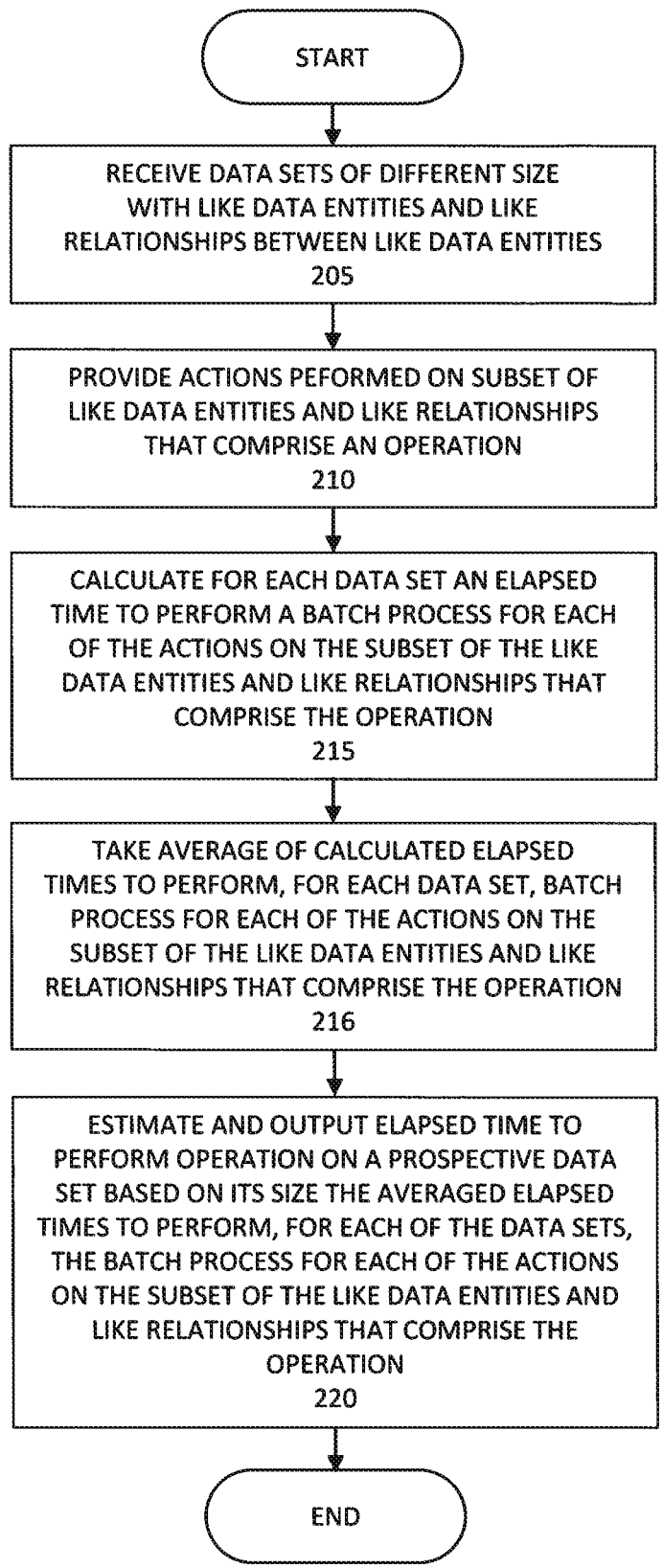
FIG. 2B depicts a functional block diagram for estimating the elapsed time to perform an operation on a prospective data set in a cloud based computing environment in accordance with disclosed embodiments.

According to embodiments of the invention 201, with reference to FIG. 2B, estimating the elapsed time to perform the operation on the prospective data set based on its selected size and the elapsed times to perform, for each of the data sets of different size, the batch process for each of the actions on the subset of the like data entities and like relationships between the like data entities that comprise the operation involves, at block 216, averaging the elapsed times to perform, for each of the data sets of different size, the batch process for each of the actions on the subset of the like data entities and like relationships between the like data entities that comprise the operation, as demonstrated in the above example. According to such embodiments, estimating at block 220 the elapsed time to perform the operation on the prospective data set is based on its selected size and the averaged elapsed times to perform, for each of the data sets of different size, the batch process for each of the actions on the subset of the like data entities and like relationships between the like data entities that comprise the operation.

According to other embodiments of the invention 202, with reference to FIG. 2C, estimating the elapsed time to perform the operation on the prospective data set based on its selected size and the elapsed times to perform, for each of the data sets of different size, the batch process for each of the actions on the subset of the like data entities and like relationships between the like data entities that comprise the operation involves, at block 217, selecting the maximum elapsed times to perform, for each of the data sets of different size, the batch process for each of the actions on the subset of the like data entities and like relationships between the like data entities that comprise the operation. According to such embodiments, estimating, at block 220, the elapsed time to perform the operation on the prospective data set is based on its selected size and the selected maximum elapsed times to perform, for each of the data sets of different size, the batch process for each of the actions on the subset of the like data entities and like relationships between the like data entities that comprise the operation.

It is appreciated that other methods may be used to calculate, for each of the data sets of different sizes 315, an elapsed time to perform a batch process for each of the actions on the subset of the data entities that comprise the operation, for later use in estimating the elapsed time to perform the operation on the prospective data set. For example, rather than calculating an average or a maximum elapsed time, as described above, a minimum elapsed time may be calculated, or a weighted average based on the per batch processing time and corresponding number of data entities processed and/or the size of the data set involved.

Generally speaking, according to embodiments of the invention, estimating the elapsed time to perform an operation on the prospective data set based on its selected size comprises receiving as input a number of a first of the like data entities in the prospective data set and estimating an elapsed time to perform the batch process for a first of the actions on the number of the first of the like data entities in the prospective data set based on the calculated elapsed time to perform the batch process for the first of the actions on a number of the first of the like data entities for each of the data sets of different size, and receiving as input another number of a second of the like data entities in the prospective data set and estimating an elapsed time to perform the batch process for a second of the actions on the other number of the second of the like data entities in the prospective data set based on the calculated elapsed time to perform the batch process for the second of the actions on a second number of the second of the like data entities for each of the data sets of different size. According to this embodiment, estimating the elapsed time to perform the operation on the prospective data set comprises adding the estimated elapsed time to perform the batch process for the number of the first of the like data entities in the prospective data set to the estimated elapsed time to perform the batch process for the other number of the second of the like data entities in the prospective data set to obtain the estimated elapsed time to perform the operation.

According to embodiments of the invention, a system is provided that executes within a host organization. The system includes a processor and a memory to execute instructions at the system. The system includes logic for estimating a time to perform an operation on a prospective data set of a selected size that includes a plurality of data entities and relationships between the data entities. In particular, the system includes an interface for receiving as input a plurality of data sets of different size each comprising a plurality of like data entities and like relationships between the like data entities, logic for providing a plurality of actions performed on a subset of the plurality of like data entities and like relationships between the like data entities that substantially comprise the operation, logic for calculating for each of the plurality of data sets of different size an elapsed time to perform a batch process for each of the plurality of actions on the subset of the plurality of like data entities and like relationships between the like data entities that comprise the operation, and logic for estimating, and providing as output, an elapsed time to perform the operation on the prospective data set based on its selected size and the elapsed times to perform, for each of the plurality of data sets of different size, the batch process for each of the plurality of actions on the subset of the plurality of like data entities and like relationships between the like data entities that comprise the operation.

Figure 8:
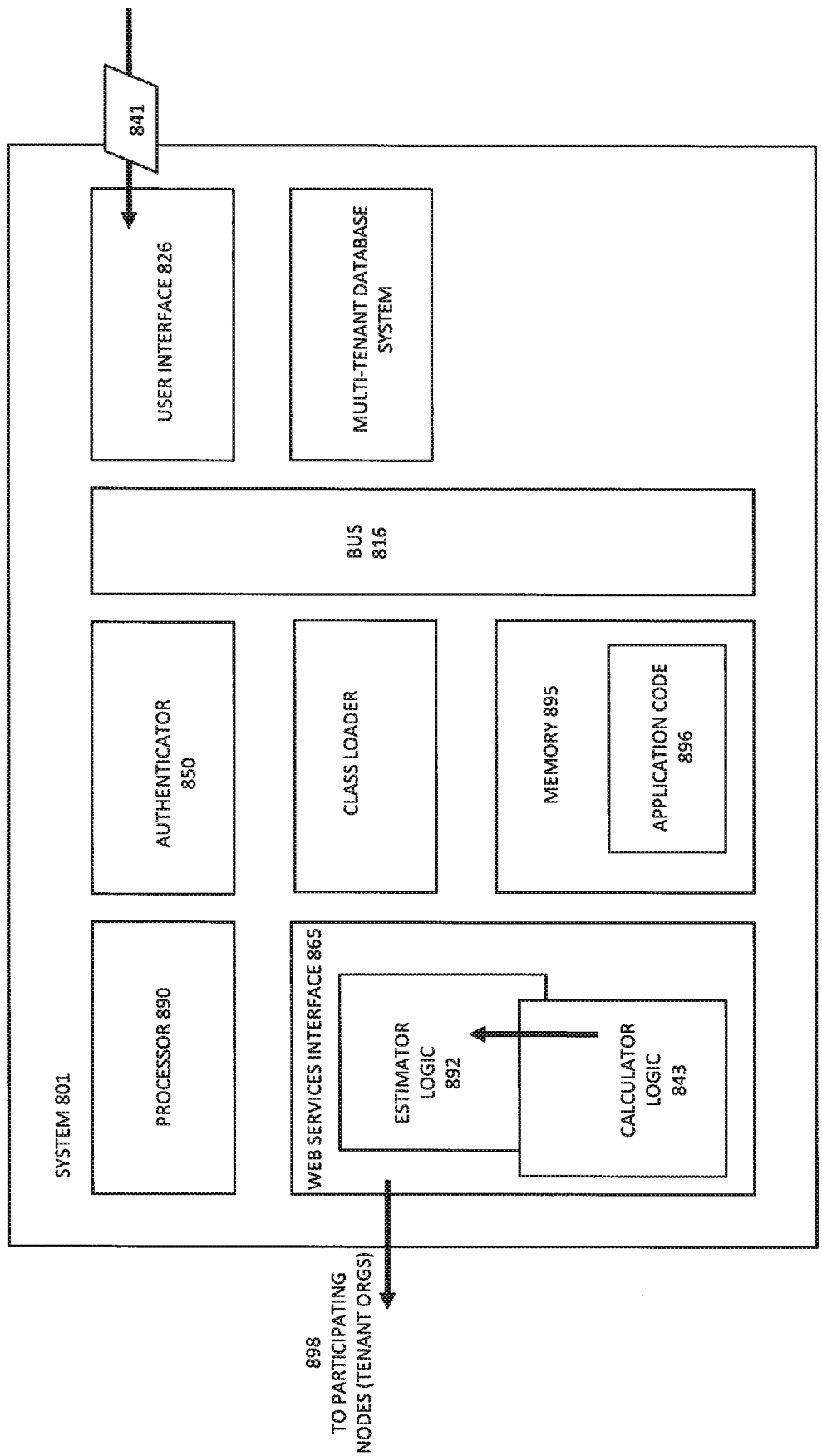
FIG. 8 illustrates a system in accordance with an embodiment of the invention.

FIG. 8 shows a diagrammatic representation of a system 801 within which the above embodiments may operate, be installed, integrated, or configured. In accordance with one embodiment, there is a system 801 having at least a processor 890 and a memory 895 therein to execute implementing application code 896 for the methodologies as described herein. Such a system 801 may communicatively interface with and cooperatively execute with the benefit of a hosted computing environment, such as a host organization, a multi-tenant environment, an on-demand service provider, a cloud based service provider, a client-server environment, etc.

According to the depicted embodiment, system 801, which may operate within a host organization, includes the processor 890 and the memory 895 to execute instructions at the system 801. According to such an embodiment, the processor 890 is to execute a web services interface 865 on behalf of a plurality of tenants 898 of the host organization. Internal to the web services interface 865, there is depicted estimator logic 892 for estimating the time to perform the operation on the prospective data set of the selected size that includes the plurality of data entities and relationships between the data entities.

A user interface 826 of the system 801 is to receive input 841 including a plurality of data sets of different size each comprising a plurality of like data entities and like relationships between the like data entities. Such a system further includes calculator logic 843 which receives the plurality of actions performed on the subset of the plurality of like data entities and like relationships between the like data entities that substantially comprise the operation, and calculate for each of the plurality of data sets of different size an elapsed time to perform a batch process for each of the plurality of actions on the subset of the plurality of like data entities and like relationships between the like data entities that comprise the operation, and then communicate with the estimator logic 892 to estimate, and provide as output, an elapsed time to perform the operation on the prospective data set based on its selected size and the elapsed times to perform, for each of the plurality of data sets of different size, the batch process for each of the plurality of actions on the subset of the plurality of like data entities and like relationships between the like data entities that comprise the operation.

Bus 816 interfaces the various components of the system 801 amongst each other, with any other peripheral(s) of the system 801, and with external components such as external network elements, other machines, client devices, cloud computing services, etc. Communications may further include communicating with external devices via a network interface over a LAN, WAN, or the public Internet while the authenticator 850 authenticates user devices and users seeking to access data from the host organization exposed by the system 801.

FIG. 6A illustrates a block diagram 600 of an environment 698 in which an on-demand database service may operate in accordance with the described embodiments. Environment 698 may include user systems 612, network 614, system 616, processor system 617, application environment or platform 618, network interface 620, tenant data storage 622, system data storage 624, program code 626, and process space 628. In other embodiments, environment 698 may not have all of the components listed and/or may have other elements instead of, or in addition to, those listed above.

Figure 6B:
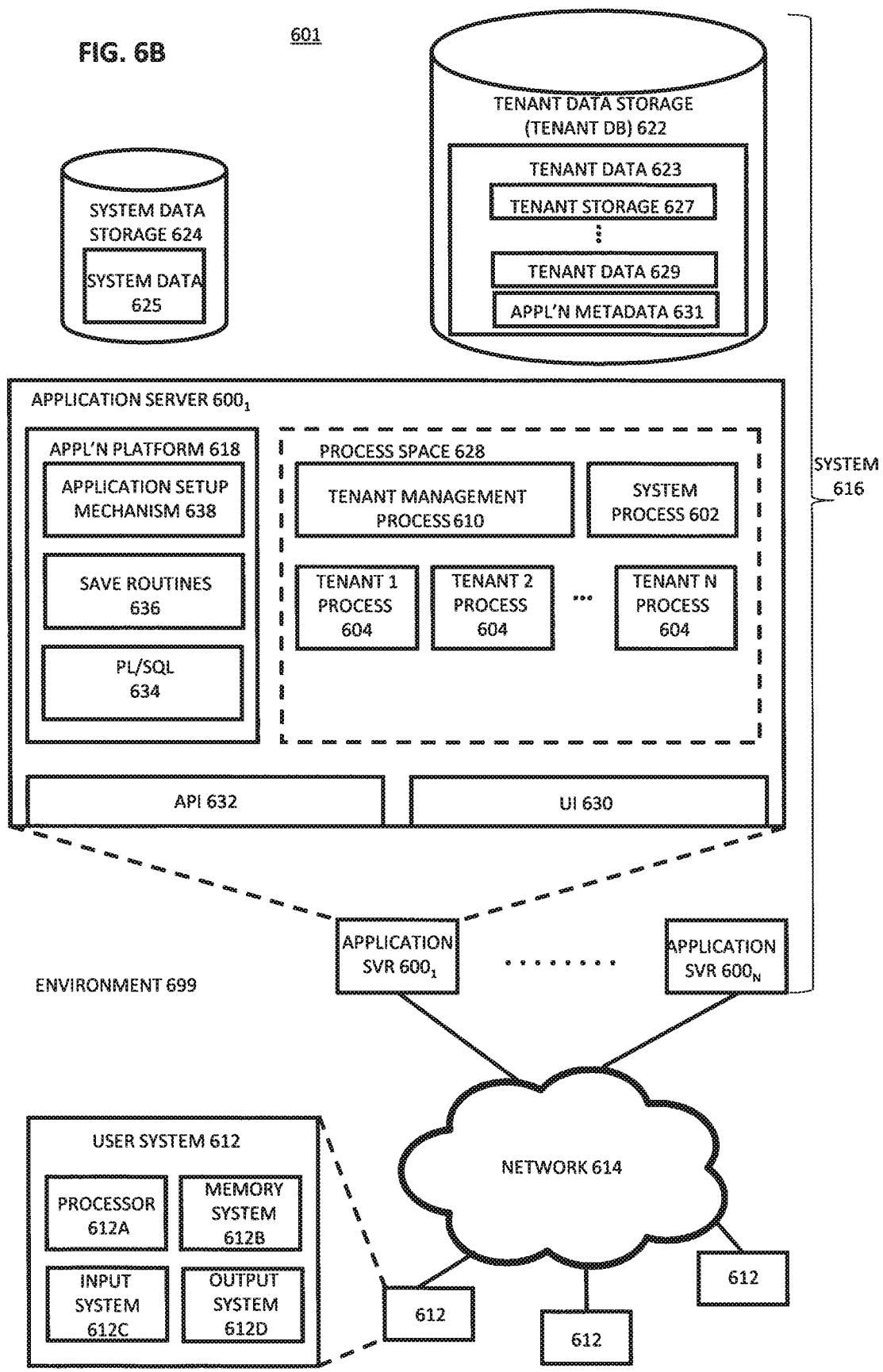

Environment 698 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in FIG. 6A (and in more detail in FIG. 6B) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" is used interchangeably herein. A database image may include one or more database objects. A relational database management system (RDMS) or the equivalent may execute storage and retrieval of information against the database object(s). Application environment 618 may be a framework that allows the applications of system 616 to run, such as the hardware and/or software, e.g., the operating system. In an embodiment, on-demand database service 616 may include an application environment 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it is understood that the networks that the claimed embodiments may utilize are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6A, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application environment 618, which manages creation, storage of the applications into one or more database objects and executing of the applications in a virtual machine in the process space of the system 616.

One arrangement for elements of system 616 is shown in FIG. 6B, including a network interface 620, application environment 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6A include conventional, well-known elements that are explained only briefly here. For example, each user system 612 may include a desktop personal computer, workstation, laptop, PDA, cell phone, or any wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, a Mozilla or Firefox browser, an Opera, or a WAP-enabled browser in the case of a smartphone, tablet, PDA or other wireless device, or the like, allowing a user (e.g., subscriber of the multi-tenant database system) of user system 612 to access, process and view information, pages and applications available to it from system 616 over network 614. Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it is understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Pentium® processor or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units.

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS may include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It is understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 6B illustrates another block diagram 601 of an embodiment of elements of FIG. 6A and various possible interconnections between such elements in accordance with the described embodiments. FIG. 6B also illustrates environment 699. However, in FIG. 6B, the elements of system 616 and various interconnections in an embodiment are illustrated in further detail. More particularly, FIG. 6B shows that user system 612 may include a processor system 612A, memory system 612B, input system 612C, and output system 612D. FIG. 6B shows network 614 and system 616. FIG. 6B also shows that system 616 may include tenant data storage 622, having therein tenant data 623, which includes, for example, tenant storage space 627, tenant data 629, and application metadata 631. System data storage 624 is depicted as having therein system data 625. Further depicted within the expanded detail of application servers $600_{1-N}$ are User Interface (UI) 630, Application Program Interface (API) 632, application environment 618 includes PL/SOQL 634, save routines 636, application setup mechanism 638, process space 628 includes system process space 602, tenant 1-N process spaces 604, and tenant management process space 610. In other embodiments, environment 699 may not have the same elements as those listed above and/or may have other elements instead of, or in addition to, those listed above.

User system 612, network 614, system 616, tenant data storage 622, and system data storage 624 were discussed above in FIG. 6A. As shown by FIG. 6B, system 616 may include a network interface 620 (of FIG. 6A) implemented as a set of HTTP application servers 600, an application environment 618, tenant data storage 622, and system data storage 624. Also shown is system process space 602, including individual tenant process spaces 604 and a tenant management process space 610. Each application server 600 may be configured to tenant data storage 622 and the tenant data 623 therein, and system data storage 624 and the system data 625 therein to serve requests of user systems 612. The tenant data 623 might be divided into individual tenant storage areas (e.g., tenant storage space 627), which can be either a physical arrangement and/or a logical arrangement of data. Within each tenant storage space 627, tenant data 629, and application metadata 631 might be similarly allocated for each user. For example, a copy of a user's most recently used (MRU) items might be stored to tenant data 629. Similarly, a copy of MRU items for an entire organization that is a tenant might be stored to tenant storage space 627. A UI 630 provides a user interface and an API 632 provides an application programmer interface into system 616 resident processes to users and/or developers at user systems 612. The tenant data and the system data may be stored in various databases, such as one or more Oracle™ databases.

Application environment 618 includes an application setup mechanism 638 that supports application developers' creation and management of applications, which may be saved as metadata into tenant data storage 622 by save routines 636 for execution by subscribers as one or more tenant process spaces 604 managed by tenant management process space 610 for example. Invocations to such applications may be coded using PL/SOQL 634 that provides a programming language style interface extension to API 632. Invocations to applications may be detected by one or more system processes, which manages retrieving application metadata 631 for the subscriber making the invocation and executing the metadata as an application in a virtual machine.

Each application server 600 may be communicably coupled to database systems, e.g., having access to system data 625 and tenant data 623, via a different network connection. For example, one application server 600$_1$ might be coupled via the network 614 (e.g., the Internet), another application server 600$_{N-1}$ might be coupled via a direct network link, and another application server 600$_N$ might be coupled by yet a different network connection. Transfer Control Protocol and Internet Protocol (TCP/IP) are typical protocols for communicating between application servers 600 and the database system. However, it will be apparent to one skilled in the art that other transport protocols may be used to optimize the system depending on the network interconnect used.

In certain embodiments, each application server 600 is configured to handle requests for any user associated with any organization that is a tenant. Because it is desirable to be able to add and remove application servers from the server pool at any time for any reason, there is preferably no server affinity for a user and/or organization to a specific application server 600. In one embodiment, therefore, an interface system implementing a load balancing function (e.g., an F5 Big-IP load balancer) is communicably coupled between the application servers 600 and the user systems 612 to distribute requests to the application servers 600. In one embodiment, the load balancer uses a least connections algorithm to route user requests to the application servers 600. Other examples of load balancing algorithms, such as round robin and observed response time, also can be used. For example, in certain embodiments, three consecutive requests from the same user may hit three different application servers 600, and three requests from different users may hit the same application server 600. In this manner, system 616 is multi-tenant, in which system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS may have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 600 to request and update system-level and tenant-level data from system 616 that may require sending one or more queries to tenant data storage 622 and/or system data storage 624. System 616 (e.g., an application server 600 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects as described herein. It is understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It is understood that the word "entity" may also be used interchangeably herein with "object" and "table."

In some multi-tenant database systems, tenants may be allowed to create and store custom objects, or they may be allowed to customize standard entities or objects, for example by creating custom fields for standard objects, including custom index fields. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 7:
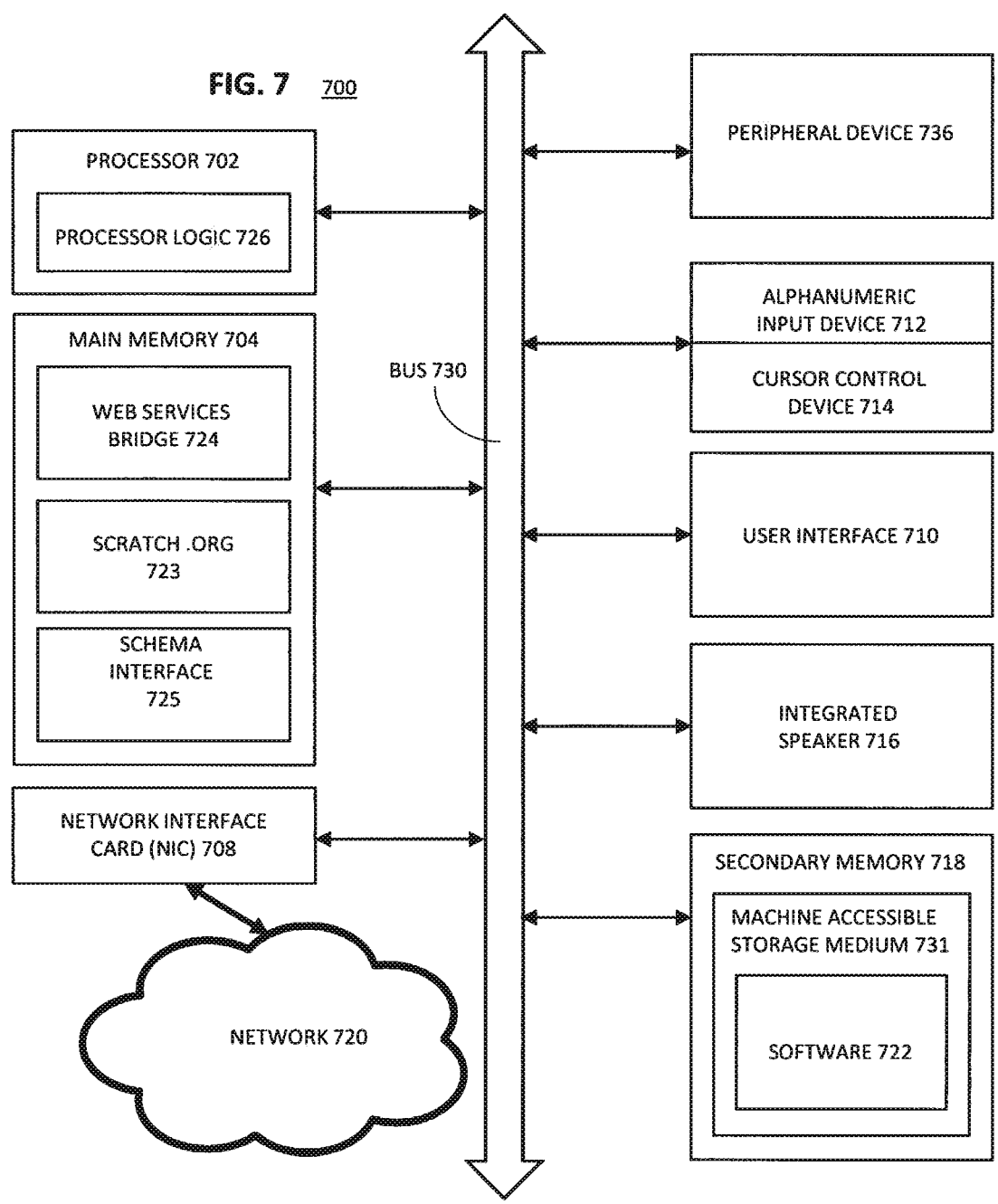
FIG. 7 illustrates a diagrammatic representation of a machine in the exemplary form of a computer system, in accordance with one embodiment.

FIG. 7 illustrates a diagrammatic representation of a machine 700 in the exemplary form of a computer system, in accordance with one embodiment, within which a set of instructions, for causing the machine/computer system 700 to perform any one or more of the methodologies discussed herein, may be executed. In alternative embodiments, the machine may be connected (e.g., networked) to other machines in a Local Area Network (LAN), an intranet, an extranet, or the public Internet. The machine may operate in the capacity of a server or a client machine in a client-server network environment, as a peer machine in a peer-to-peer (or distributed) network environment, as a server or series of servers within an on-demand service environment. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 718 (e.g., a persistent storage device including hard disk drives and a persistent database and/or a multi-tenant database implementation), which communicate with each other via a bus 730. Main memory 704 includes a web services bridge 724 and a schema interface 725 and a scratch.org 723 by which to communicate with another web services environment, retrieve, and parse a schema to identify methods provided by the web service at the other web services environment in accordance with described embodiments. Main memory 704 and its sub-elements are operable in conjunction with processing logic 726 and processor 702 to perform the methodologies discussed herein.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 702 may also be one or more special-purpose processing devices such as an application specific integrated circuit (ASIC), a field programmable gate array (FPGA), a digital signal processor (DSP), network processor, or the like. Processor 702 is configured to execute the processing logic 726 for performing the operations and functionality which is discussed herein.

The computer system 700 may further include a network interface card 708. The computer system 700 also may include a user interface 710 (such as a video display unit, a liquid crystal display, etc.), an alphanumeric input device 712 (e.g., a keyboard), a cursor control device 714 (e.g., a mouse), and a signal generation device 716 (e.g., an integrated speaker). The computer system 700 may further include peripheral device 736 (e.g., wireless or wired communication devices, memory devices, storage devices, audio processing devices, video processing devices, etc.).

The secondary memory 718 may include a non-transitory machine-readable storage medium or a non-transitory computer readable storage medium or a non-transitory machine-accessible storage medium 731 on which is stored one or more sets of instructions (e.g., software 722) embodying any one or more of the methodologies or functions described herein. The software 722 may also reside, completely or at least partially, within the main memory 704 and/or within the processor 702 during execution thereof by the computer system 700, the main memory 704 and the processor 702 also constituting machine-readable storage media. The software 722 may further be transmitted or received over a network 720 via the network interface card 708.

While the subject matter disclosed herein has been described by way of example and in terms of the specific embodiments, it is to be understood that the claimed embodiments are not limited to the explicitly enumerated embodiments disclosed. To the contrary, the disclosure is intended to cover various modifications and similar arrangements as are apparent to those skilled in the art. Therefore, the scope of the appended claims are to be accorded the broadest interpretation so as to encompass all such modifications and similar arrangements. It is to be understood that the above description is intended to be illustrative, and not restrictive. Many other embodiments will be apparent to those of skill in the art upon reading and understanding the above description. The scope of the disclosed subject matter is therefore to be determined in reference to the appended claims, along with the full scope of equivalents to which such claims are entitled.

What is claimed is:

1. A method of estimating a time to perform an operation on a prospective data set of a selected size that includes a plurality of data entities and relationships between the data entities, comprising:

receiving as input a plurality of data sets of different size each comprising a plurality of like data entities and like relationships between the like data entities;

providing as output a plurality of actions performed on a subset of the plurality of like data entities and like relationships between the like data entities that substantially comprise the operation;

calculating for each of the plurality of data sets of different size an elapsed time to perform a batch process for each of the plurality of actions on the subset of the plurality of like data entities and like relationships between the like data entities that comprise the operation;

estimating, and providing as output, an elapsed time to perform the operation on the prospective data set based on its selected size and the elapsed times to perform, for each of the plurality of data sets of different size, the batch process for each of the plurality of actions on the subset of the plurality of like data entities and like relationships between the like data entities that comprise the operation;

wherein estimating the elapsed time to perform the operation on the prospective data set based on its selected size and the elapsed times to perform, for each of the plurality of data sets of different size, the batch process for each of the plurality of actions on the subset of the plurality of like data entities and like relationships between the like data entities that comprise the operation, comprises:

averaging the elapsed times to perform, for each of the plurality of data sets of different size, the batch process for each of the plurality of actions on the subset of the plurality of like data entities and like relationships between the like data entities that comprise the operation; and estimating the elapsed time to perform the operation on the prospective data set based on its selected size and the averaged elapsed times to perform, for each of the plurality of data sets of different size, the batch process for each of the plurality of actions on the subset of the plurality of like data entities and like relationships between the like data entities that comprise the operation.

2. The method of claim 1, wherein estimating the elapsed time to perform the operation on the prospective data set based on its selected size and the elapsed times to perform, for each of the plurality of data sets of different size, the batch process for each of the plurality of actions on the subset of the plurality of like data entities and like relationships between the like data entities that comprise the operation, comprises:
   selecting a maximum of the elapsed times to perform, for each of the plurality of data sets of different size, the batch process for each of the plurality of actions on the subset of the plurality of like data entities and like relationships between the like data entities that comprise the operation; and
   estimating the elapsed time to perform the operation on the prospective data set based on its selected size and the maximum elapsed times to perform, for each of the plurality of data sets of different size, the batch process for each of the plurality of actions on the subset of the plurality of like data entities and like relationships between the like data entities that comprise the operation.

3. The method of claim 1, wherein calculating for each of the plurality of data sets of different size the elapsed time to perform the batch process for each of the plurality of actions on the subset of the plurality of like data entities and like relationships between the like data entities that comprise the operation, comprises calculating for each of the plurality of data sets of different size:
   an elapsed time to perform a batch process for a first of the plurality of actions on a first number of a first of the plurality of like data entities; and
   an elapsed time to perform a batch process for a second of the plurality of actions on a second number of a second of the plurality of like data entities related to the first of the plurality of like data entities.

4. The method of claim 3, wherein estimating the elapsed time to perform the operation on the prospective data set based on its selected size and the elapsed times to perform, for each of the plurality of data sets of different size, the batch process for each of the plurality of actions on the subset of the plurality of like data entities and like relationships between the like data entities that comprise the operation, comprises estimating the elapsed time to perform the operation on the prospective data set based on its selected size, the elapsed time to perform the batch process for the first of the plurality of actions on the first number of the first of the plurality of like data entities, and the elapsed time to perform the batch process for the second of the plurality of actions on the second number of the second of the plurality of like data entities related to the first of the plurality of like data entities.

5. The method of claim 3, wherein estimating the elapsed time to perform the operation on the prospective data set based on its selected size comprises:
   receiving as input a third number of the first of the plurality of like data entities in the prospective data set;
   estimating an elapsed time to perform the batch process for the first of the plurality of actions on the third number of the first of the plurality of like data entities in the prospective data set based on the calculated elapsed time to perform the batch process for the first of the plurality of actions on the first number of the first of the plurality of like data entities for each of the plurality of data sets of different size;
   receiving as input a fourth number of the second of the plurality of like data entities in the prospective data set in the prospective data set; and
   estimating an elapsed time to perform the batch process for the second of the plurality of actions on the fourth number of the second of the plurality of like data entities in the prospective data set based on the calculated elapsed time to perform the batch process for the second of the plurality of actions on the second number of the second of the plurality of like data entities for each of the plurality of data sets of different size.

6. The method of claim 5, wherein estimating the elapsed time to perform the operation on the prospective data set comprises adding the estimated elapsed time to perform the batch process for the third number of the first of the plurality of like data entities in the prospective data set to the estimated elapsed time to perform the batch process for the fourth number of the second of the plurality of like data entities in the prospective data set to obtain the estimated elapsed time to perform the operation.

7. The method of claim 1, wherein providing as output the plurality of actions performed on the subset of the plurality of like data entities and like relationships between the like data entities that substantially comprise the operation comprises providing as output a plurality of independent, asynchronous, actions performed on the subset of the plurality of like data entities and like relationships between the like data entities that substantially comprise the operation.

8. A system to execute within a host organization, wherein the system comprises:
   a processor and a memory to execute instructions at the system, the system providing:
   logic for estimating a time to perform an operation on a prospective data set of a selected size that includes a plurality of data entities and relationships between the data entities, comprising:
   an interface for receiving as input a plurality of data sets of different size each comprising a plurality of like data entities and like relationships between the like data entities;
   logic for providing a plurality of actions performed on a subset of the plurality of like data entities and like relationships between the like data entities that substantially comprise the operation;
   logic for calculating for each of the plurality of data sets of different size an elapsed time to perform a batch process for each of the plurality of actions on the subset of the plurality of like data entities and like relationships between the like data entities that comprise the operation; and
   logic for estimating, and providing as output, an elapsed time to perform the operation on the prospective data set based on its selected size and the elapsed times to perform, for each of the plurality of data sets of different size, the batch process for each of the plurality of actions on the subset of the plurality of like data entities and like relationships between the like data entities that comprise the operation;
   wherein estimating the elapsed time to perform the operation on the prospective data set based on its selected size and the elapsed times to perform, for each of the plurality of data sets of different size, the batch process for each of the plurality of actions on the subset of the plurality of like data entities and like relationships between the like data entities that comprise the operation, comprises:
averaging the elapsed times to perform, for each of the plurality of data sets of different size, the batch process for each of the plurality of actions on the subset of the plurality of like data entities and like relationships between the like data entities that comprise the operation; and
estimating the elapsed time to perform the operation on the prospective data set based on its selected size and the averaged elapsed times to perform, for each of the plurality of data sets of different size, the batch process for each of the plurality of actions on the subset of the plurality of like data entities and like relationships between the like data entities that comprise the operation.

9. The system of claim 8, wherein the logic for calculating for each of the plurality of data sets of different size the elapsed time to perform the batch process for each of the plurality of actions on the subset of the plurality of like data entities and like relationships between the like data entities that comprise the operation, comprises logic for calculating for each of the plurality of data sets of different size:
an elapsed time to perform a batch process for a first of the plurality of actions on a first number of a first of the plurality of like data entities; and
an elapsed time to perform a batch process for a second of the plurality of actions on a second number of a second of the plurality of like data entities related to the first of the plurality of like data entities.

10. The system of claim 9, wherein the logic for estimating the elapsed time to perform the operation on the prospective data set based on its selected size and the elapsed times to perform, for each of the plurality of data sets of different size, the batch process for each of the plurality of actions on the subset of the plurality of like data entities and like relationships between the like data entities that comprise the operation, comprises logic for estimating the elapsed time to perform the operation on the prospective data set based on its selected size, the elapsed time to perform the batch process for the first of the plurality of actions on the first number of the first of the plurality of like data entities, and the elapsed time to perform the batch process for the second of the plurality of actions on the second number of the second of the plurality of like data entities related to the first of the plurality of like data entities.

11. The system of claim 9, wherein the logic for estimating the elapsed time to perform the operation on the prospective data set based on its selected size comprises:
logic for receiving as input a third number of the first of the plurality of like data entities in the prospective data set;
logic for estimating an elapsed time to perform the batch process for the first of the plurality of actions on the third number of the first of the plurality of like data entities in the prospective data set based on the calculated elapsed time to perform the batch process for the first of the plurality of actions on the first number of the first of the plurality of like data entities for each of the plurality of data sets of different size;
logic for receiving as input a fourth number of the second of the plurality of like data entities in the prospective data set in the prospective data set; and
logic for estimating an elapsed time to perform the batch process for the second of the plurality of actions on the fourth number of the second of the plurality of like data entities in the prospective data set based on the calculated elapsed time to perform the batch process for the second of the plurality of actions on the second number of the second of the plurality of like data entities for each of the plurality of data sets of different size.

12. The system of claim 11, wherein the logic for estimating the elapsed time to perform the operation on the prospective data set comprises logic for adding the estimated elapsed time to perform the batch process for the third number of the first of the plurality of like data entities in the prospective data set to the estimated elapsed time to perform the batch process for the fourth number of the second of the plurality of like data entities in the prospective data set to obtain the estimated elapsed time to perform the operation.

13. Non-transitory computer readable storage media having instructions stored thereon that, when executed by a processor of a system, the instructions cause the system to estimate a time to perform an operation on a prospective data set including a plurality of data entities and relationships between the data entities, comprising:
receiving as input a plurality of data sets of different size each comprising a plurality of like data entities and like relationships between the like data entities;
providing as output a plurality of actions performed on a subset of the plurality of like data entities and like relationships between the like data entities that substantially comprise the operation;
calculating for each of the plurality of data sets of different size an elapsed time to perform a batch process for each of the plurality of actions on the subset of the plurality of like data entities and like relationships between the like data entities that comprise the operation;
estimating, and providing as output, an elapsed time to perform the operation on the prospective data set based on its selected size and the elapsed times to perform, for each of the plurality of data sets of different size, the batch process for each of the plurality of actions on the subset of the plurality of like data entities and like relationships between the like data entities that comprise the operation;
wherein estimating the elapsed time to perform the operation on the prospective data set based on its selected size and the elapsed times to perform, for each of the plurality of data sets of different size, the batch process for each of the plurality of actions on the subset of the plurality of like data entities and like relationships between the like data entities that comprise the operation, comprises:
averaging the elapsed times to perform, for each of the plurality of data sets of different size, the batch process for each of the plurality of actions on the subset of the plurality of like data entities and like relationships between the like data entities that comprise the operation; and
estimating the elapsed time to perform the operation on the prospective data set based on its selected size and the averaged elapsed times to perform, for each of the plurality of data sets of different size, the batch process for each of the plurality of actions on the subset of the plurality of like data entities and like relationships between the like data entities that comprise the operation.

14. The non-transitory computer readable storage media of claim 13, wherein the instructions for calculating for each of the plurality of data sets of different size the elapsed time to perform the batch process for each of the plurality of actions on the subset of the plurality of like data entities and like relationships between the like data entities that comprise the operation, comprises logic for calculating for each of the plurality of data sets of different size:

an elapsed time to perform a batch process for a first of the plurality of actions on a first number of a first of the plurality of like data entities; and an elapsed time to perform a batch process for a second of the plurality of actions on a second number of a second of the plurality of like data entities related to the first of the plurality of like data entities.

15. The non-transitory computer readable storage media of claim 14, wherein the instructions for estimating the elapsed time to perform the operation on the prospective data set based on its selected size and the elapsed times to perform, for each of the plurality of data sets of different size, the batch process for each of the plurality of actions on the subset of the plurality of like data entities and like relationships between the like data entities that comprise the operation, comprises instructions for estimating the elapsed time to perform the operation on the prospective data set based on its selected size, the elapsed time to perform the batch process for the first of the plurality of actions on the first number of the first of the plurality of like data entities, and the elapsed time to perform the batch process for the second of the plurality of actions on the second number of the second of the plurality of like data entities related to the first of the plurality of like data entities.

16. The non-transitory computer readable storage media of claim 14, wherein the instructions for estimating the elapsed time to perform the operation on the prospective data set based on its selected size comprises:

instructions for receiving as input a third number of the first of the plurality of like data entities in the prospective data set;

instructions for estimating an elapsed time to perform the batch process for the first of the plurality of actions on the third number of the first of the plurality of like data entities in the prospective data set based on the calculated elapsed time to perform the batch process for the first of the plurality of actions on the first number of the first of the plurality of like data entities for each of the plurality of data sets of different size;

instructions for receiving as input a fourth number of the second of the plurality of like data entities in the prospective data set in the prospective data set; and instructions for estimating an elapsed time to perform the batch process for the second of the plurality of actions on the fourth number of the second of the plurality of like data entities in the prospective data set based on the calculated elapsed time to perform the batch process for the second of the plurality of actions on the second number of the second of the plurality of like data entities for each of the plurality of data sets of different size.

17. The non-transitory computer readable storage media of claim 16, wherein the instructions for estimating the elapsed time to perform the operation on the prospective data set comprises instructions for adding the estimated elapsed time to perform the batch process for the third number of the first of the plurality of like data entities in the prospective data set to the estimated elapsed time to perform the batch process for the fourth number of the second of the plurality of like data entities in the prospective data set to obtain the estimated elapsed time to perform the operation.

* * * * *